No. 642,394. Patented Jan. 30, 1900.
L. WATKINS.
TRACKING CONNECTION FOR VEHICLES.
(Application filed June 5, 1899.)
(No Model.)
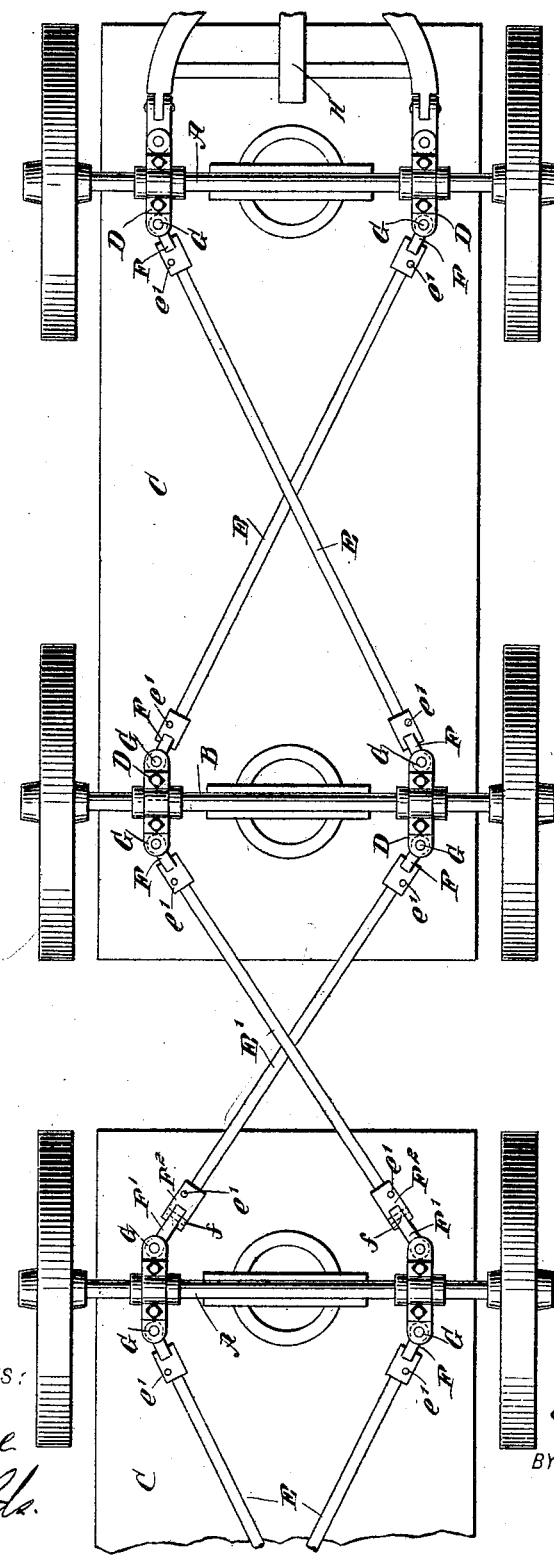
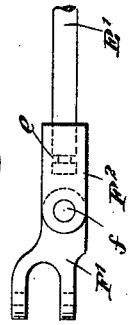
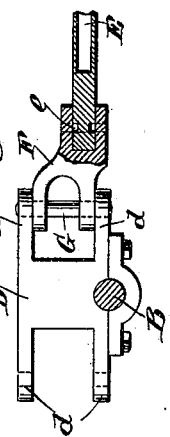
WITNESSES:
Edw. Thorpe
H. L. Reynolds
INVENTOR
L. Watkins
BY
ATTORNEYS
THE NORRIS PETERS CO., PHOTO-LITHO., WASHINGTON, D. C.

UNITED STATES PATENT OFFICE.

LEIGH WATKINS, OF CRIPPLE CREEK, COLORADO.

TRACKING CONNECTION FOR VEHICLES.

SPECIFICATION forming part of Letters Patent No. 642,394, dated January 30, 1900.

Application filed June 5, 1899. Serial No. 719,444. (No model.)

*To all whom it may concern:*

Be it known that I, LEIGH WATKINS, of Cripple Creek, in the county of Teller and State of Colorado, have invented a new and Improved Tracking Connection for Vehicles, of which the following is a full, clear, and exact description.

My invention relates to an improvement in the manner of connecting the axles of a vehicle to make the wheels track and for connecting the adjacent axles of two vehicles in order to make the wheels of each vehicle track.

My invention comprises the novel features which will be hereinafter described and claimed.

Reference is to be had to the accompanying drawings, forming a part of this specification, in which similar characters of reference indicate corresponding parts in all the figures.

Figure 1 is an inverted plan view of my device in use upon vehicles. Fig. 2 is a detail showing the manner of connecting one of the rods hereinafter described with the axle, and Fig. 3 is a similar detail view of the form of connection which is used in certain other places.

The object of my invention is to connect the axle of a vehicle or the adjacent axles of two vehicles so that all of the wheels will track—
that is, run in the same track—whether going straight ahead or turning corners.

The form of vehicle to which my invention is applied is immaterial, although it has been especially designed for application to vehicles which are used in connection with traction-engines or other forms of power-driven vehicles, or to a train of wagons such as used in the western part of the United States for hauling heavy freight. The vehicles as herein shown are such as have the axles mounted to turn upon a king-bolt, as is done in connection with the forward axle of an ordinary wagon.

The device may be used to connect two ordinary wagons, and while not making all the wheels track perfectly will make them track more nearly than is usually the case.

In Fig. 1 the axle A is the forward axle of the vehicle, and the axle B the rear axle. I have herein shown the forward wagon as being provided with a tongue H, which is secured to the forward axle, so that the wagons are steered in the usual manner by the team. It is, however, evident that the particular form of steering mechanism used for guiding the first wagon is immaterial, as my invention pertains to the manner of connecting the axles of the wagon or of wagons connected in a train.

Upon each end of the axles A and B are secured clips D, one of which is shown in side elevation in Fig. 2. These clips have ears $d$ at each end thereof, which receive a pivot-pin G, to which connecting-bars E are secured. The bars or rods E are provided at each end with a swivel connection with a clevis F or F' F², as the case may be. The rods E are preferably made of pipe having a plug welded or otherwise secured in each end thereof. The ends of these rods are provided with peripheral grooves $e$, which receive a pin $e'$, which passes through the stem of the clevis F or F' F², thus holding the two against longitudinal movement, but permitting rotative movement. The clevis F, as shown in Fig. 2, has two arms engaging the inner surfaces of the ears $d$ upon the clip D and provided with holes receiving the pivot-pin G. The rods E extend diagonally beneath the bed C of the wagon and are connected to clips upon the opposite ends of the adjacent axles. In order to prevent interference of the two rods with each other where they cross, the rods are secured to the clevis at a point offset from the center thereof, as clearly shown in Fig. 2. In placing the two rods in place one rod will have its clevis reversed from the position shown in Fig. 2, said rod thus being raised, so that it passes clear of the other rod.

In order to assure a flexibility in the connection between adjacent wagons which will permit them to run over elevations and depressions in the roads without binding, the rods which connect adjacent wagons are preferably provided on at least one end with a clevis having a pivot-joint therein such as shown in Fig. 3. In this view the clevis is shown as consisting of two parts F' and F², the part F' being adapted to receive the pivot-pin G and the part F² receiving the end of the rod E'. The rod E' is secured to the part F² of the clevis in the manner previously described, consisting in forming a peripheral groove $e$ in the rod and inserting a pin $e'$ through the clevis and into said groove. The two parts F and F² are connected with each other by means of a horizontal pivot $f$, so that the rods may bend in a vertical plane as the wagons pass over inequalities in the road.

This method of connecting the wheels of a wagon or of connecting adjacent wagons will permit them to pass around curves of any practical radius and yet with an assurance that the wheels will accurately track. In hauling freight over rough mountain roads, where the width of the track is limited and frequent curves are necessary, it is often a matter of considerable importance to have the wagons track, as such hauling is frequently done with a team consisting of a large number of animals, and more than one wagon is drawn thereby.

Having thus fully described my invention, I claim as new and desire to secure by Letters Patent—

1. A wheel-tracking connection for vehicle-axles, comprising two rods having clevises swiveled upon their ends and connected with opposite ends of adjacent axles, substantially as described.

2. A trailing or tracking attachment for vehicles, comprising two rods having clevises swiveled at each end and also provided with a hinged joint, and means for pivotally attaching the clevises to opposite ends of the axles of the vehicles so that the rods will cross, substantially as described.

3. A trailing or tracking attachment for vehicles, comprising two rods having clevises attached to their ends by a swivel-joint which is offset from the central line of the clevis, and means for connecting the clevises to opposite ends of adjacent vehicles, substantially as described.

LEIGH WATKINS.

Witnesses:
GEO. M. STINGLEY,
CARRIE M. BOOTH.